US012680532B2

(12) United States Patent
Smook et al.

(10) Patent No.:  US 12,680,532 B2
(45) Date of Patent:       Jul. 14, 2026

(54) SPACE-SAVING HOUSING MOUNTING

(71) Applicants:ZF FRIEDRICHSHAFEN AG,
Friedrichshafen (DE); ZF WIND POWER ANTWERPEN N.V.,
Lommel (BE)

(72) Inventors: Warren Smook, Huldenberg (BE);
Sven Moers, Westerlo (BE); Alf Trede,
Immenstedt (DE)

(73) Assignees: ZF FRIEDRICHSHAFEN AG,
Friedrichshafen (DE); ZF WIND POWER ANTWERPEN N.V.,
Lommel (BE)

( * ) Notice: Subject to any disclaimer, the term of this
patent is extended or adjusted under 35
U.S.C. 154(b) by 0 days.

(21) Appl. No.: 18/865,352

(22) PCT Filed: Apr. 19, 2023

(86) PCT No.: PCT/EP2023/060064
§ 371 (c)(1),
(2) Date: Nov. 13, 2024

(87) PCT Pub. No.: WO2023/222318
PCT Pub. Date: Nov. 23, 2023

(65) Prior Publication Data
US 2025/0198389 A1       Jun. 19, 2025

(30) Foreign Application Priority Data

May 17, 2022    (DE) ..................... 10 2022 204 901.2

(51) Int. Cl.
F03D 15/10        (2016.01)
F03D 80/70        (2016.01)
(Continued)

(52) U.S. Cl.
CPC ........... *F03D 15/10* (2016.05); *F03D 80/703*
(2023.08); *F16H 57/025* (2013.01);
(Continued)

(58) Field of Classification Search
CPC ...... F03D 15/10; F03D 80/703; F16H 57/025;
F16H 2057/02078; F05B 2240/14; F05B
2240/90; F05B 2260/301
See application file for complete search history.

(56) References Cited

U.S. PATENT DOCUMENTS 8,434,996 B2 *   5/2013   Bagepalli ............ G01M 5/0016
                                                                   416/61
8,632,437 B2 *   1/2014   Dinter ................... F16H 57/025
                                                                  475/347

(Continued)

FOREIGN PATENT DOCUMENTS

CN         103671845 A  *   3/2014   ........... F16H 57/029
CN         203730576 U      7/2014
(Continued)

*Primary Examiner* — Adam D Rogers
(74) *Attorney, Agent, or Firm* — LEYDIG, VOIT &
MAYER, LTD.

(57)                    ABSTRACT

A housing for a wind turbine gearbox, including at least two
bolt eyes for receiving a respective bolt for fixing a housing
in a nacelle-fixing means. In each case two bolt eyes are
mirror-symmetrical to each other with respect to a first
longitudinal plane. The bolt eyes are arranged entirely on a
same side of a second longitudinal plane which runs
orthogonally to the first longitudinal plane.

13 Claims, 7 Drawing Sheets

(51) Int. Cl.
  *F16H 57/02* (2012.01)
  *F16H 57/025* (2012.01)

(52) U.S. Cl.
  CPC ....... *F05B 2240/14* (2013.01); *F05B 2240/90* (2013.01); *F05B 2260/301* (2013.01); *F16H 2057/02078* (2013.01)

(56) References Cited

U.S. PATENT DOCUMENTS

| | | | | |
|---|---|---|---|---|
| 9,051,922 | B2 * | 6/2015 | Boing | H02K 7/116 |
| 9,523,356 | B2 * | 12/2016 | Michalski | F01D 25/28 |
| 9,683,553 | B2 * | 6/2017 | Mashtare | F03D 17/00 |
| 9,803,739 | B2 * | 10/2017 | Ohl, Jr. | F16H 57/025 |
| 11,255,313 | B2 * | 2/2022 | Wertz | F03D 15/10 |
| 11,384,742 | B2 * | 7/2022 | Vanhollebeke | F03D 15/00 |
| 12,553,414 | B2 * | 2/2026 | Trede | F03D 15/10 |
| 2010/0296933 | A1 | 11/2010 | Hicks et al. | |
| 2012/0076652 | A1 | 3/2012 | Ventzke et al. | |
| 2020/0309098 | A1 | 10/2020 | Wertz et al. | |
| 2022/0003304 | A1 * | 1/2022 | Wuerr | F03D 15/00 |
| 2022/0128037 | A1 * | 4/2022 | Volmer | F03D 80/88 |
| 2024/0167459 | A1 * | 5/2024 | Smook | F03D 80/70 |
| 2025/0198388 | A1 * | 6/2025 | Trede | F03D 80/881 |

FOREIGN PATENT DOCUMENTS

| | | | | | |
|---|---|---|---|---|---|
| CN | 207500065 | U | | 6/2018 | |
| CN | 110469655 | A | * | 11/2019 | F16D 1/09 |
| CN | 120520952 | A | * | 8/2025 | F03D 15/00 |
| DE | 102007053586 | A1 | * | 5/2009 | F03D 13/20 |
| DE | 102015211794 | A1 | * | 12/2016 | F03D 15/00 |
| DE | 102015220996 | A1 | * | 4/2017 | F16H 57/025 |
| DE | 102023209114 | B3 | * | 11/2024 | F03D 80/70 |
| DE | 102023210095 | B3 | * | 3/2025 | F03D 80/703 |
| DE | 102024104796 | A1 | * | 8/2025 | F16C 43/02 |
| WO | WO-2024175774 | A1 | * | 8/2024 | F16C 27/063 |

* cited by examiner

SPACE-SAVING HOUSING MOUNTING

CROSS REFERENCE TO RELATED APPLICATIONS

This application is a U.S. National Phase application under 35 U.S.C. § 371 of International Application No. PCT/EP2023/060064, filed on Apr. 19, 2023, and claims benefit to German Patent Application No. DE 10 2022 204 901.2, filed on May 17, 2022. The International Application was published in German on Nov. 23, 2023 as WO 2023/222318 A1 under PCT Article 21(2).

FIELD

The invention relates to housings for wind turbine gearboxes and a method for assembling the housing of a wind turbine gearbox.

BACKGROUND

Wind turbine gearboxes with torque support arms are known from the prior art, which support themselves in the machine carrier of a nacelle via connecting bolts. The torque support arms extend from a housing of the wind turbine gearbox laterally outwards. This is associated with a corresponding space requirement in the nacelle.

SUMMARY

In an embodiment, the present disclosure provides a housing for a wind turbine gearbox, comprising at least two bolt eyes for receiving a respective bolt for fixing a housing in a nacelle-fixing means. In each case two bolt eyes are mirror-symmetrical to each other with respect to a first longitudinal plane. The bolt eyes are arranged entirely on a same side of a second longitudinal plane which runs orthogonally to the first longitudinal plane.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
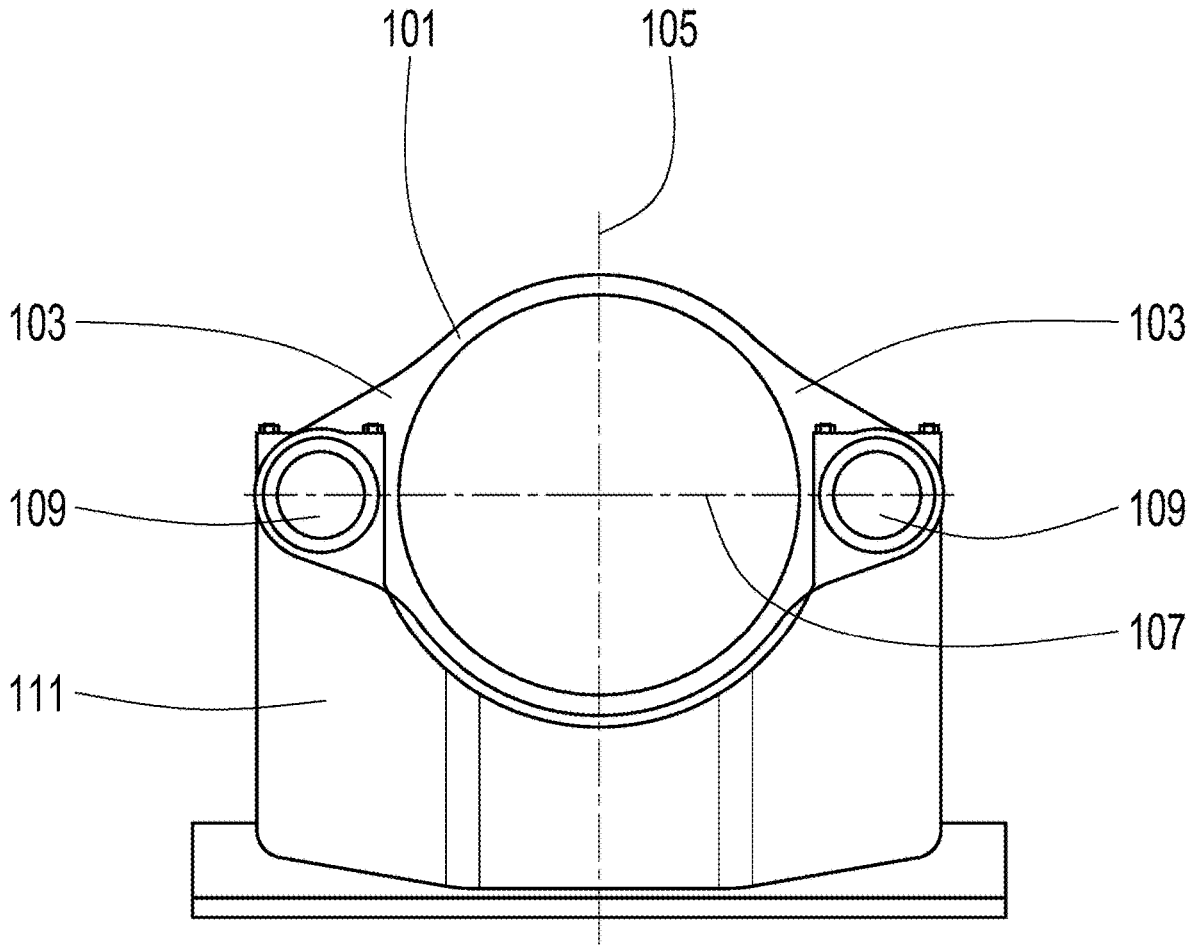
FIG. 1 illustrates a gearbox housing known from the prior art.

Embodiments of the present invention provide an improved wind turbine gearbox compared to the prior art. Preferred embodiments are included in the following description.

A housing according to an embodiment of the invention is a housing for a wind turbine gearbox, i.e. a housing for a gearbox which is configured for use as a gearbox in the drivetrain of a wind turbine.

The housing has at least two bolt eyes. A bolt eye is a cylindrical recess for receiving an equally cylindrical part of a bolt. Preferably, the recess and the part of the bolt are each circular-cylindrical.

The at least two bolt eyes of the housing serve to fix the housing in a nacelle of the wind turbine and/or in a nacelle-fixed means. A nacelle-fixed means is a means that is fixed, i.e. without the possibility of relative movement, in the nacelle. A machine carrier for receiving and fixing the drivetrain, for example, is a nacelle-fixed means.

For fixing the housing by means of the at least one bolt, the nacelle-fixed means for its part has at least two bolt eyes. These are each part of a group of at least two, preferably three, bolt eyes aligned with each other.

The group includes at least one bolt eye of the housing in addition to the at least two bolt eyes of the nacelle-fixed means. This means that each group comprises at least one bolt eye of the housing and at least one bolt eye of the nacelle-fixed means. Preferably, a group comprises exactly two bolt eyes of the housing and exactly one bolt eye of the nacelle-fixed means, exactly one bolt eye of the housing and exactly two bolt eyes of the nacelle-fixed means or exactly one bolt eye of the housing and exactly one bolt eye of the nacelle-fixed means.

There is exactly one bolt for each group, which engages in the bolt eyes of the group. Accordingly, the bolt eyes of each group are aligned with each other. Due to the bolt, the bolt eyes of the respective group are fixed relative to each other.

The at least two bolt eyes of the housing are mirror-symmetrical to each other with respect to a first longitudinal plane. This implies that the at least two bolt eyes belong to different groups.

A longitudinal plane is a plane that contains a longitudinally running reference axis. In this case, the axis of rotation of the input shaft of the wind turbine gearbox serves as the longitudinally oriented reference axis. The first longitudinal plane preferably runs vertically.

Embodiments of the present invention provide for a second longitudinal plane which runs orthogonally to the first longitudinal plane. The bolt eyes are arranged completely on the same side of the second longitudinal plane. Preferably, the at least two bolt eyes are located below the second longitudinal plane.

The result is a shift in the position of the bolt eyes out from the lateral regions of the housing, thereby reducing the distance between the at least two bolt eyes to each other. The lateral space requirement of the housing is reduced accordingly.

In an embodiment, the central axes of the bolt eyes, i.e. the central axes of the cylinders, which each describe the shape of a bolt eye, run parallel to the first longitudinal plane and/or the second longitudinal plane. If the central axes of the bolt eyes run parallel to the first longitudinal plane and the second longitudinal plane, then the result is that the central axes run parallel to the axis of rotation of the input shaft of the wind turbine gearbox.

The housing is preferably configured with defined distances between the central axes of the bolt eyes and the first plane and the second plane. The distances are selected such that the bolt eyes are positioned in the corner regions of the nacelle. Here there is installation space that would otherwise not be used. This makes particularly effective use of the installation space available in the nacelle.

In an embodiment, the distance between the center axes of the bolt eyes and the first plane is not greater than twice the distance between the center axes of the bolt eyes and the second plane.

In an embodiment, the distance between the center axes of the bolt eyes and the first plane is not greater than the distance between the center axes and the second plane. This corresponds to an arrangement of the bolt eyes such that their central axes form an angle not greater than 450 with the axis of rotation of the input shaft of the wind turbine gearbox.

Conversely, in an embodiment, the distance between the center axes of the bolt eyes and the second plane is not greater than twice the distance between the center axes of the bolt eyes and the first plane.

In an embodiment, the distance between the center axes of the bolt eyes and the second plane is not greater than the distance between the center axes and the first plane. This corresponds to an angle of not less than 45° between the center axes of the bolt eyes and the axis of rotation of the input shaft of the wind turbine gearbox.

In particular, an arrangement of the bolt eyes is provided in such a way that the distance between their central axes and the first plane coincides with the distance between their central axes and the second plane. This corresponds to an angle of exactly 45° between the center axes and the axis of rotation of the input shaft of the wind turbine gearbox.

In an embodiment, a housing wall has at least two support arms. The housing wall refers to a part of the housing that encapsulates a cavity in which the internals of the gearbox, such as shafts, bearings and gears, are located. For example, the housing wall can encapsulate a rotor and/or input shaft of the gearbox and its bearings.

The housing wall separates the cavity from the surrounding of the housing. The housing wall thus runs between the cavity and the surrounding. Support arms refer to support structures for the housing wall. The support arms are used to support torques and other forces acting on the housing. In particular, the support arms can be integrally connected to the housing wall.

In a further embodiment, the at least two support arms each have one of the at least two bolt eyes.

The at least two bolt eyes are each formed by a means that has the corresponding recess for receiving the respective bolt. The means can be integrally connected to the housing and/or to the respective support arm. In a preferred further embodiment, however, the means are configured as pieces that are physically separate from the housing wall, in particular from the support arms. The at least two means are thus, according to an embodiment, not integrally connected to the housing wall. Preferably, the at least two means are detachably joined to the housing wall and/or to one of the at least two support arms in each case.

In an embodiment, the at least two support arms each have one of the at least two means. Since the support arms are part of the housing wall, there is, according to an embodiment, a physical separation between the means and the respective support arm.

The at least two means, which each have one of the at least two bolt eyes, can be configured in two pieces. In this case, the at least two means each consist of at least two physically separate pieces that are joined together. Preferably, the pieces are detachably joined together. Elastomers, with which the at least two means are mounted in the bolts, are easier to insert into the respective bolt eye in a two-piece configuration.

According to an embodiment, one of the pieces is connected integrally to the housing wall and/or to one of the support arms. The two-piece configuration of the at least two means ensures a simplified assembly and disassembly.

The at least two means, each having one of the at least two bolt eyes, can alternatively be integrally connected to the respective bolt in accordance with the present disclosure. The above embodiments relating to the bolt eyes then apply mutatis mutandis to the bolts.

A physically separate configuration of the at least two means from the housing wall together with the arrangement of the bolt eyes according to the present disclosure, is advantageous with regard to the assemblability and disassemblability of the wind turbine gearbox in the nacelle. As a result of the arrangement of the bolt eyes according to the present disclosure, their accessibility deteriorates. Due to the configuration as pieces physically separated from the housing wall, it is provided, in a method according to an embodiment of the invention, to first fix the at least two means in the nacelle by means of the respective bolt before the at least two means are subsequently joined to the housing wall and/or to the respective support arm. This is done by inserting the bolt into the bolt eyes of the respective group.

Embodiments of the invention are shown in FIGS. 2 to 7. FIG. 1 shows the prior art. Corresponding reference numerals indicate identical or functionally identical features.

The gearbox housing 101 shown in FIG. 1 is known from the prior art. It forms torque support arms 103 which are mirror-symmetrical to a sagittal plane 105. Starting from a wall of the housing 101, the torque support arms 103 extend horizontally towards the side. A transverse plane 107 intersects the torque support arms 103. The torque support arms 103 are each fixed in a machine carrier 111 via a bolt 109.

Figure 2:
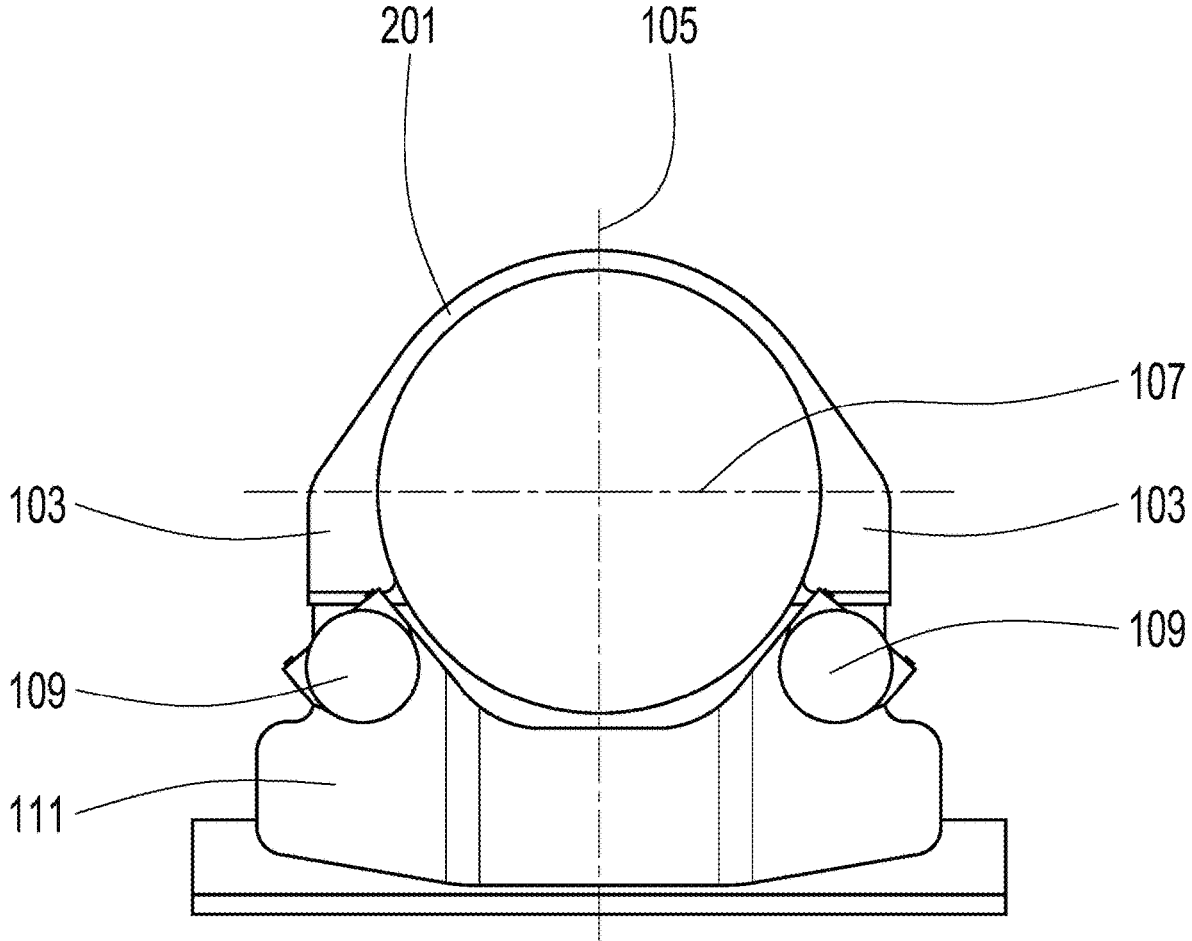
FIG. 2 illustrates a gearbox housing with space-saving arrangement of torque support arms.

A space-saving alternative according to the present disclosure is shown in FIG. 2. A corresponding gearbox housing 201 supports itself via torque support arms 103 and bolts 109 in a machine carrier 111. Compared to the solution shown in FIG. 1, the bolts 109 have been moved offset downwards and are therefore closer together. This results in more space toward the side.

To accommodate the bolts 109, bolt eyes with corresponding formations are provided in the machine carrier. These formations prevent the bolts 109 from being inserted from above together with the gearbox housing 101.

In order to still be able to install the gearbox housing 101 in the machine carrier 111, the torque support arms 103 have a multi-part-configuration. This can be seen in FIG. 3.

For each bolt 109, two half-shells 301 are screwed to the machine carrier 111, each of which forms a bolt eye together with the formation in the machine carrier 111.

The torque support arms each consist of rib-shaped supports connected integrally to the gearbox housing 101 and a bolt receptacle 303. This is screwed to the respective supports and forms a further bolt eye.

In each case, a bolt 109 is inserted into two bolt eyes, each of which is formed by the machine carrier 111 and a half-shell 301, and into a bolt eye formed by a bolt receptacle 303. In this way, the bolt connects the three bolt eyes to each other.

Figure 3:
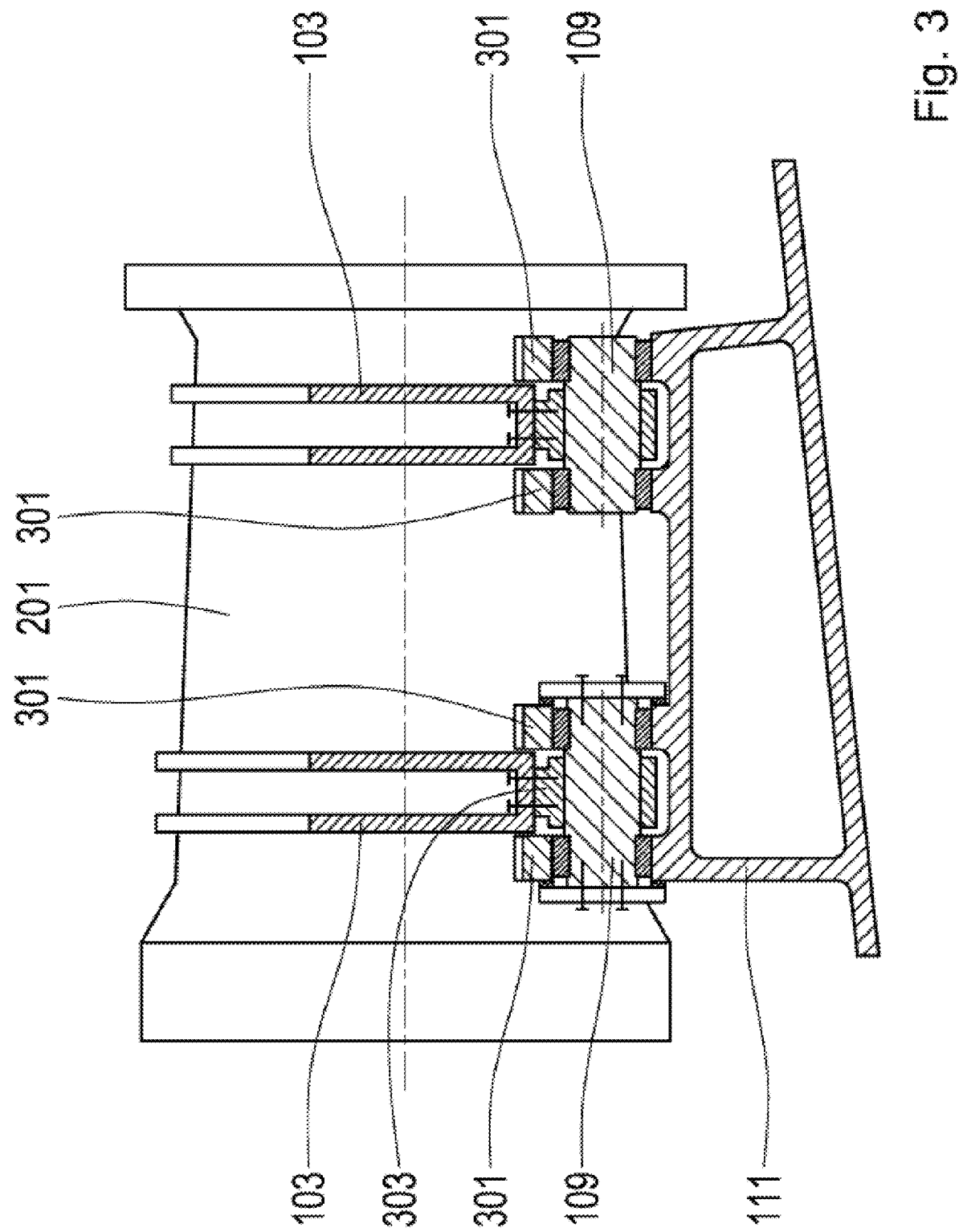
FIG. 3 illustrates a side view of a gearbox housing.

According to FIG. 3, the bolts 109 and the bolt receptacles 303 are each configured in two pieces. The bolt receptacles 303 form a bolt eye. Alternatively, a one-piece connection between the bolts 109 and the respective bolt receptacle 303 is provided. A corresponding gearbox housing 401 is shown in FIG. 4.

Figure 4:
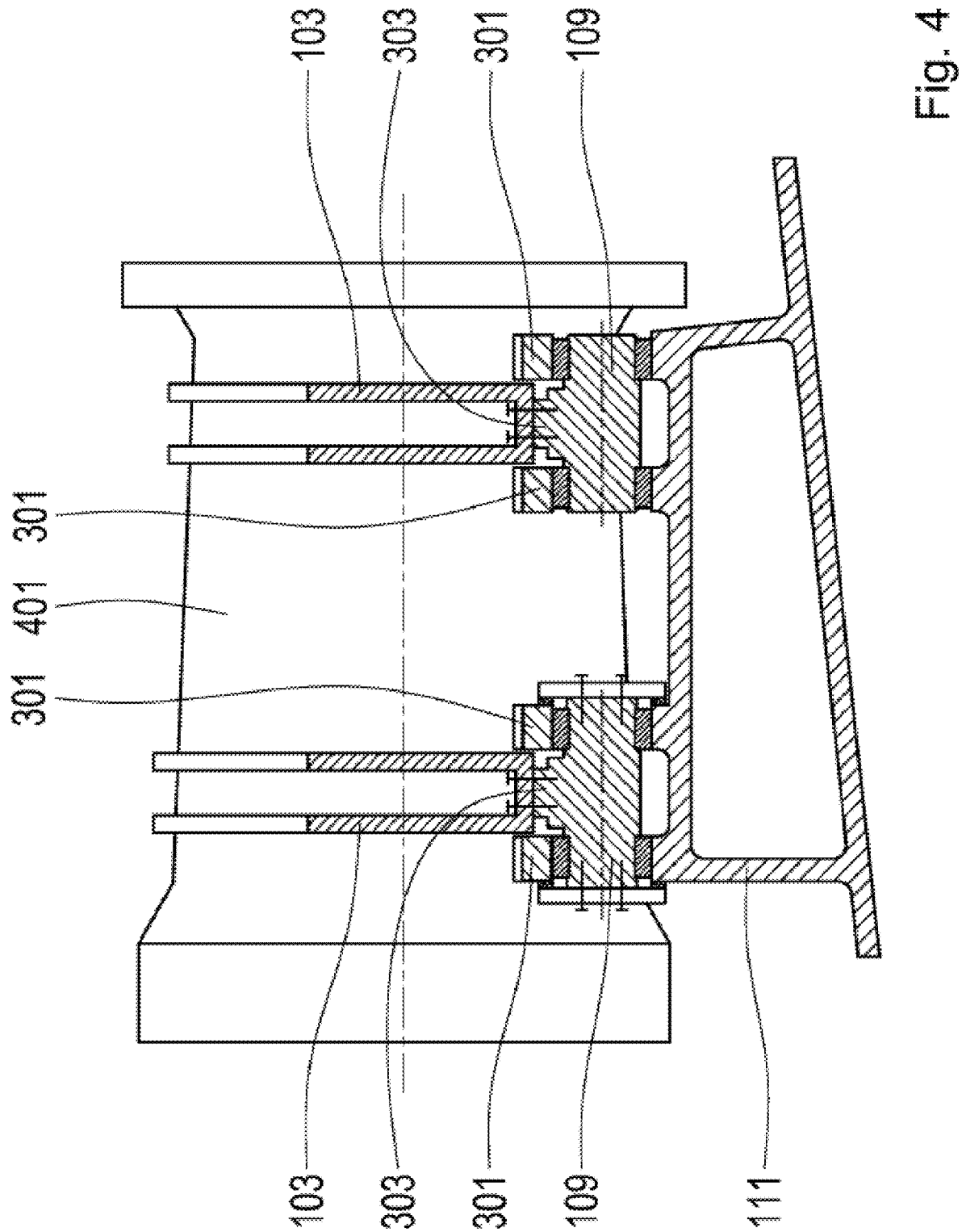
FIG. 4 illustrates a gearbox housing integrated in one piece into bolt receptacles.
Figure 5:
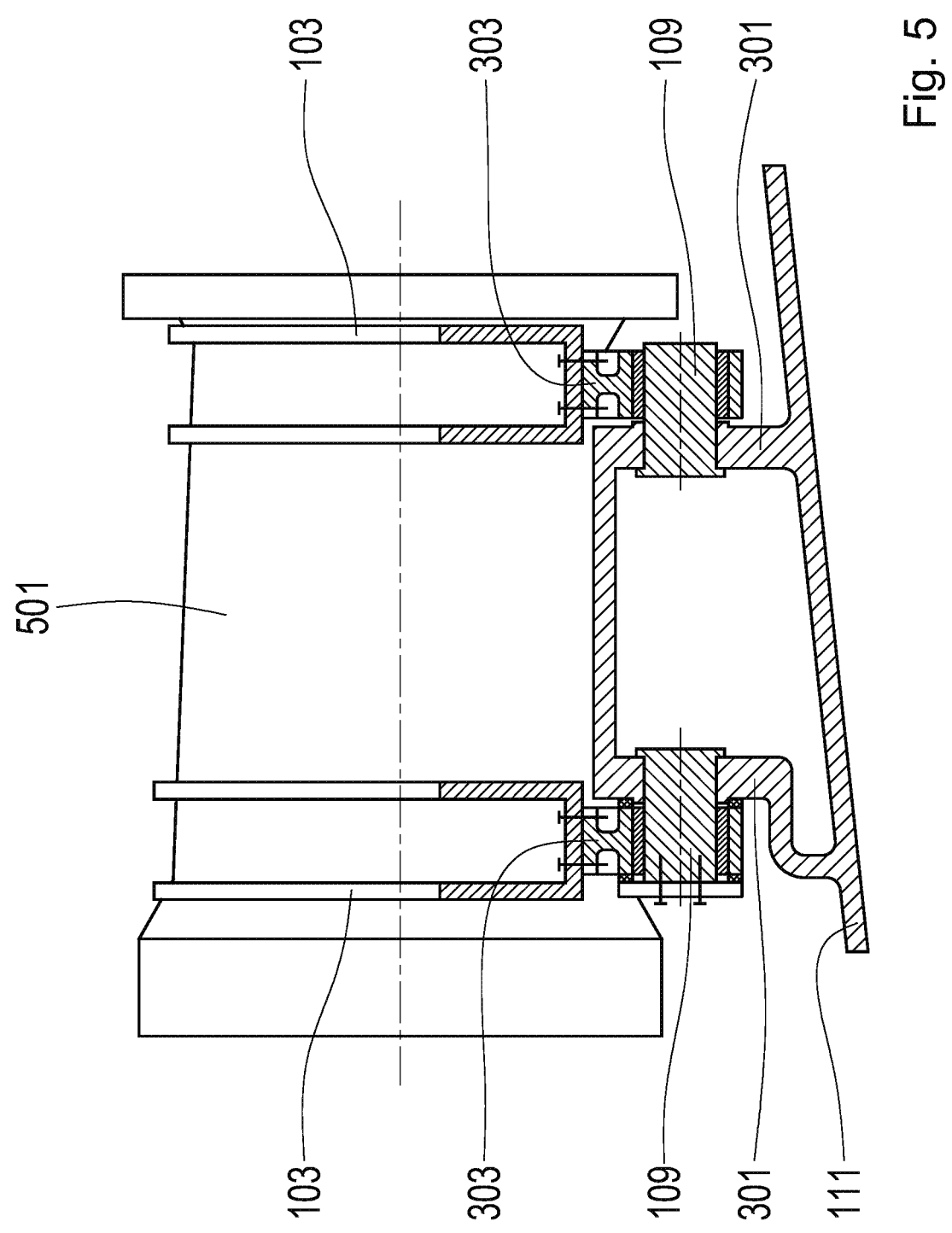
FIG. 5 illustrates fixing of bolts on one side of a gearbox housing.

The gearbox housing 501 shown in FIG. 5 corresponds in its structure to the gearbox housings 201, 401 shown in FIGS. 2 to 4. The mounting of the bolts 109 in the machine carrier 111 is realized differently here. While the bolts 109 in FIGS. 2 to 4 are mounted on both sides of the respective bolt receptacle 303 and/or are fixed in the machine carrier 111, FIG. 5 shows a single-sided mounting. In FIGS. 2 to 4, the machine bed 111 has two bolt eyes for each bolt 109, in which the bolt 109 is fixed. In contrast, the machine bed 111 shown in FIG. 5 forms only one bolt eye for each bolt 109.

Figure 6:
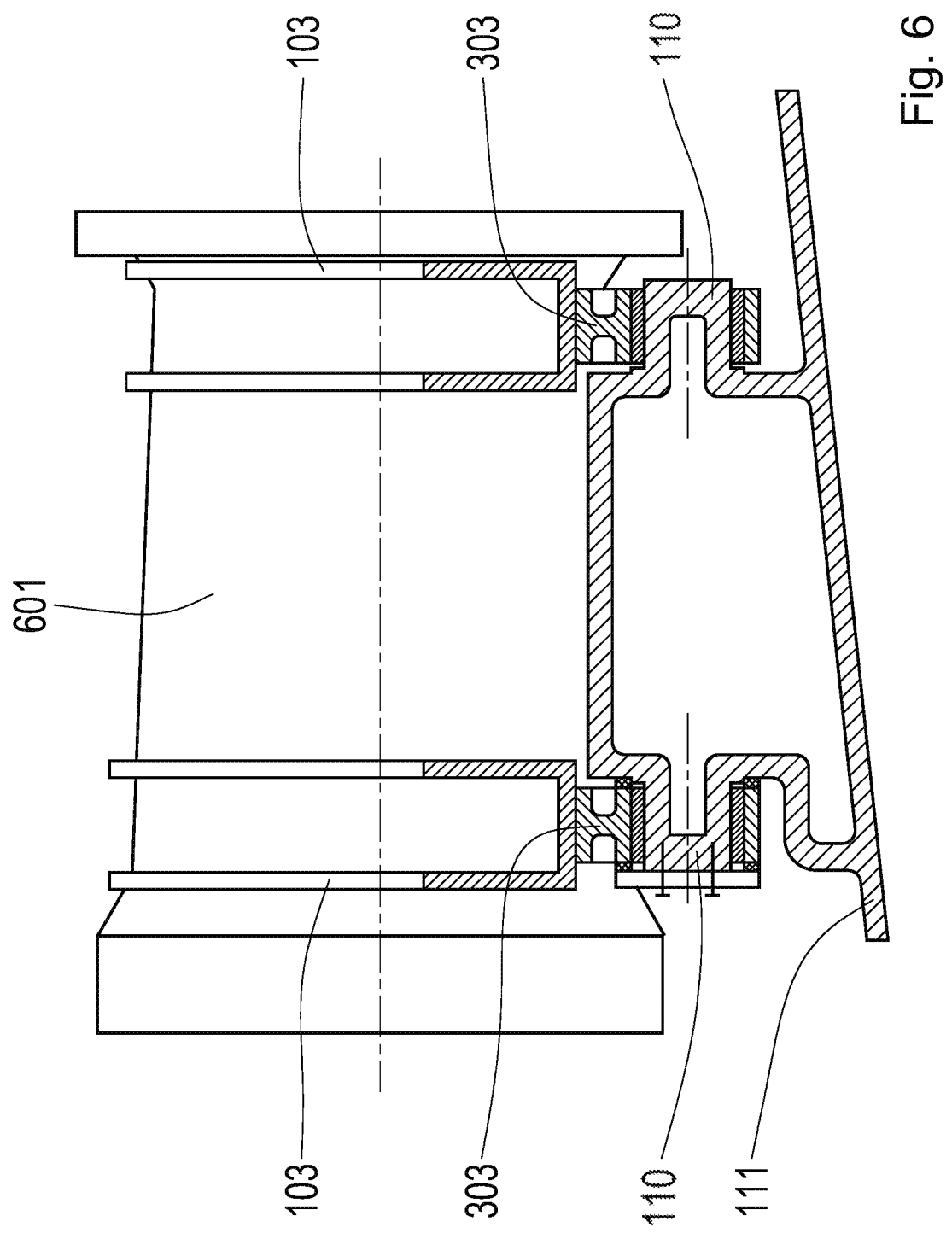
FIG. 6 illustrates bolts integrated in one piece in a machine carrier.

In FIG. 5. the bolts 109 and the machine bed 111 are configured as physically separate pieces. FIG. 6 shows an exemplary embodiment in which the bolts are formed as protrusions 110 integrated in one piece in the machine carrier 111 instead of being formed as separate components therefrom. Otherwise, the configuration of the gearbox housing 601 shown in FIG. 6 and the mounting in the machine carrier 111 correspond to the arrangement in FIG. 5.

Figure 7:
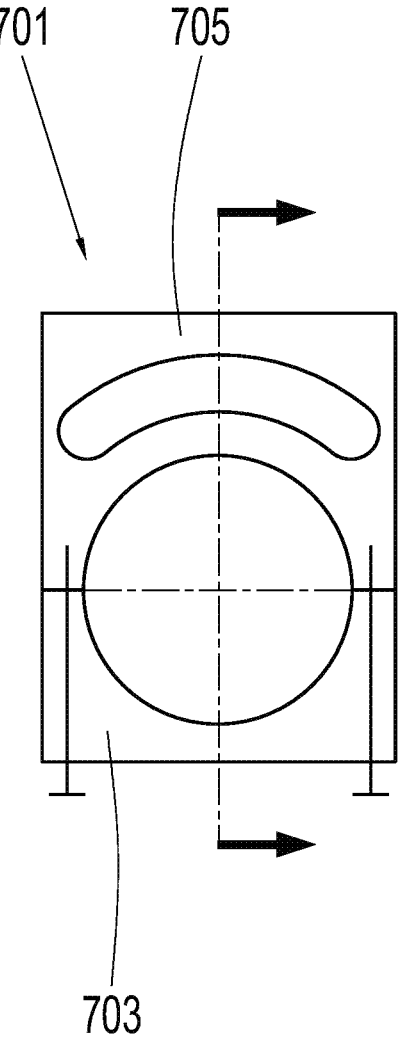
FIG. 7 illustrates two-piece bolt receptacles.
Figure 7:
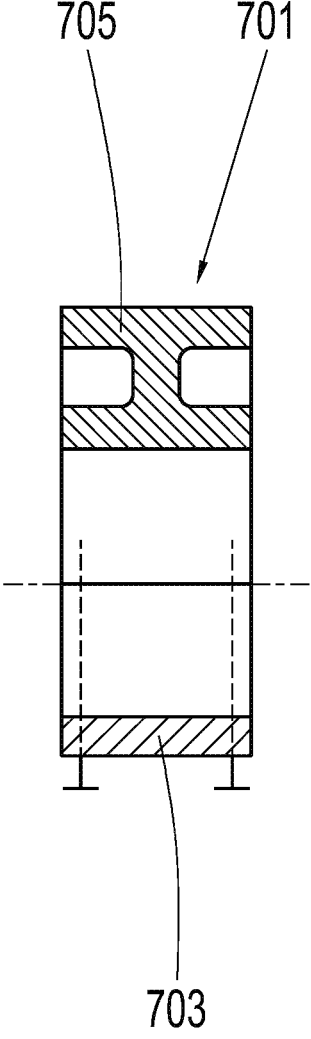

FIG. 7 shows a bolt receptacle 701 that can be used instead of the bolt receptacles 303 shown in FIGS. 2 to 6. The bolt receptacle 701 consists of a lower piece 703 and an upper piece 705. The two pieces 703 and 705 are screwed together. The two-piece configuration of the bolt holder 701 makes it possible to connect the upper piece 705 integrally to a torque support arm 103.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 gearbox housing
103 torque support arm
105 sagittal plain
107 transverse plane
109 bolt
111 machine carrier 201 gearbox housing
301 half-shell
303 bolt receptacle
401 gearbox housing
501 gearbox housing
601 gearbox housing
701 bolt receptacle
703 lower piece
705 upper piece

The invention claimed is:

1. A housing for a wind turbine gearbox, comprising:
at least two bolt eyes for receiving a respective bolt for fixing the housing in a nacelle-fixing means;
a housing wall having at least two support arms; and
at least two bolt receptacles, each having one of the at least two bolt eyes, the at least two bolt receptacles being physically separate from the housing wall,
wherein in each case, the at least two bolt eyes are mirror-symmetrical to each other with respect to a first longitudinal plane,
wherein the bolt eyes are arranged entirely on a same side of a second longitudinal plane which runs orthogonally to the first longitudinal plane, and
wherein the at least two support arms are offset from one another in a longitudinal direction of the wind turbine gearbox.

2. The housing according to claim 1, wherein central axes of the bolt eyes each run parallel to the first longitudinal plane and/or the second longitudinal plane.

3. The housing according to claim 2, wherein the central axes of the bolt eyes each extend parallel to the first longitudinal plane and the second longitudinal plane, and
wherein a distance between the central axes and the first longitudinal plane is not greater than twice a distance from the central axes to the second longitudinal plane.

4. The housing according to claim 2, wherein a distance between the central axes of the bolt eyes and the second longitudinal plane is not greater than twice a distance between the center axes of the bolt eyes and the first longitudinal plane.

5. The housing according to claim 1, wherein:
the at least two support arms each have one of the at least two bolt receptacles, and
the bolt receptacles are each configured as pieces that are physically separate from a respective support arm.

6. The housing according to claim 1, wherein the at least two bolt receptacles are offset from the nacelle-fixing means so as to form a gap between each bolt receptacle and the nacelle-fixing means.

7. The housing according to claim 6, wherein the nacelle-fixing means includes half-shells configured to receive the at least two bolts, and wherein the gap between each bolt receptacle and the nacelle-fixing means is between each of the at least two bolts and each half-shell of the nacelle-fixing means.

8. A method for assembling the housing according to claim 1, wherein the at least two bolt receptacles are first fixed in the nacelle-fixing means by a respective bolt and subsequently joined to the housing wall.

9. A housing for a wind turbine gearbox, comprising:
at least two bolts for fixing the housing in a nacelle-fixing means, wherein the at least two bolts are mirror-symmetrical relative to a first longitudinal plane, and
wherein at least two bolt receptacles are formed, a first of the at least two bolt receptacles being monolithically formed as part of a first of the at least two bolts and a second of the at least two bolt receptacles being mono-lithically formed as part of a second of the at least two bolts; and a housing wall, wherein the at least two bolts are arranged entirely on a same side of a second longitudinal plane which runs orthogonally to the first longitudinal plane, and wherein the at least two bolt receptacles are physically separate pieces from the housing wall and are joined to the housing wall.

10. A housing for a wind turbine gearbox, comprising:

at least two bolt eyes for receiving a respective bolt for fixing the housing in a nacelle-fixing means;

a housing wall having at least two support arms, each of which includes one of the at least two bolt eyes; and at least two bolt receptacles, each having one of the at least two bolt eyes, wherein in each case two bolt eyes are mirror-symmetrical to each other with respect to a first longitudinal plane, wherein the bolt eyes are arranged entirely on a same side of a second longitudinal plane which runs orthogonally to the first longitudinal plane, wherein the at least two bolt receptacles are each formed in two pieces that are each configured to receive the respective bolt, and wherein one piece of the two pieces of each of the at least two bolt receptacles is integrally connected to a housing wall.

11. The housing according to claim 10, wherein the two pieces of each of the at least two bolt receptacles comprise an upper piece and a lower piece, each of the upper pieces being integrally connected to the housing wall.

12. The housing according to claim 11, wherein each upper piece includes curved recesses arranged on opposite longitudinal ends of the respective upper piece such that a cross-section of the upper piece forms an I-beam shape.

13. The housing according to claim 12, wherein each curved recess has a curvature that follows a circumferential periphery of a respective bolt eye.

* * * * *